(12) United States Patent
Jiang et al.

(10) Patent No.: US 11,079,304 B2
(45) Date of Patent: Aug. 3, 2021

(54) FOCAL-LENGTH MEASURING APPARATUS FOR SUB WAVELENGTH OPTICAL IMAGING DEVICE AND MEASURING METHOD THEREOF

(71) Applicant: Xihua University, Chengdu (CN)

(72) Inventors: Wenbo Jiang, Chengdu (CN); Yun Bu, Chengdu (CN); Nan Wang, Chengdu (CN); Xiao Ren, Chengdu (CN)

(73) Assignee: XIHUA UNIVERSITY, Chengdu (CN)

( * ) Notice: Subject to any disclaimer, the term of this patent is extended or adjusted under 35 U.S.C. 154(b) by 197 days.

(21) Appl. No.: 16/468,283

(22) PCT Filed: Oct. 18, 2018

(86) PCT No.: PCT/CN2018/110907
§ 371 (c)(1),
(2) Date: Jun. 11, 2019

(87) PCT Pub. No.: WO2020/051975
PCT Pub. Date: Mar. 19, 2020

(65) Prior Publication Data
US 2021/0055182 A1    Feb. 25, 2021

(30) Foreign Application Priority Data

Sep. 13, 2018   (CN) .......................... 201811067021.X

(51) Int. Cl.
*G01M 11/02*    (2006.01)
*G02B 27/30*    (2006.01)
*G02B 27/48*    (2006.01)

(52) U.S. Cl.
CPC ......... *G01M 11/0264* (2013.01); *G02B 27/30* (2013.01); *G02B 27/48* (2013.01)

(58) Field of Classification Search
CPC ... G01M 11/0264; G01M 11/02; G02B 27/30; G02B 27/48; G02B 19/0052;
(Continued)

(56) References Cited

U.S. PATENT DOCUMENTS 6,433,301 B1 *  8/2002  Dunsky .............. B23K 26/0732
                                                      219/121.67
6,493,075 B1   12/2002  Huang et al.
(Continued)

FOREIGN PATENT DOCUMENTS

CA          1310205 C     11/1992
CN        102243137 A     11/2011
(Continued)

*Primary Examiner* — Isiaka O Akanbi
(74) *Attorney, Agent, or Firm* — Bayramoglu Law Offices LLC

(57) ABSTRACT

A focal-length measuring apparatus for a sub-wavelength optical imaging device includes a laser, a beam-expanding and collimating system, a sub-wavelength optical imaging device, and a nanoscale stepped height standard sample block. The nanoscale stepped height standard sample block is connected to a power device, and the power device is connected to a computer control system. The nanoscale stepped height standard sample block is coated with a photoresist and includes a plurality of steps arranged at equal intervals Among all the steps, the heights of the steps gradually increase from a middle step to an upper side, and the values of the corresponding focal lengths decrease. While, the heights of the steps gradually decrease from the middle step to a lower side, and values of corresponding focal lengths increase. A wavelength of the laser is equal to a designed wavelength of an input light source of the sub-wavelength optical imaging device.

13 Claims, 1 Drawing Sheet

(58) Field of Classification Search
CPC .... G02B 19/0095; G02B 9/04; G02B 11/026; G02B 11/24; B23K 26/066
USPC ................ 356/123, 601–624, 125, 364, 521
See application file for complete search history.

(56) References Cited

U.S. PATENT DOCUMENTS

| | | | | |
|---|---|---|---|---|
| 6,791,060 B2* | 9/2004 | Dunsky | ............... | B23K 26/0732 |
| | | | | 219/121.7 |
| 6,804,269 B2* | 10/2004 | Lizotte | ............... | B23K 26/0608 |
| | | | | 372/100 |
| 2002/0001088 A1* | 1/2002 | Wegmann | ............... | G03F 7/706 |
| | | | | 356/521 |
| 2007/0194254 A1* | 8/2007 | Hubertus Mulkens | ............... | |
| | | | | G03F 7/70091 |
| | | | | 250/504 R |
| 2012/0223214 A1* | 9/2012 | Lee | ............... | H01L 27/14621 |
| | | | | 250/208.1 |
| 2013/0069360 A1* | 3/2013 | Power | ............... | B42D 25/351 |
| | | | | 283/85 |
| 2014/0132952 A1* | 5/2014 | Zhu | ............... | B23K 26/705 |
| | | | | 356/124 |
| 2015/0090908 A1* | 4/2015 | Lippert | ............... | G01B 11/02 |
| | | | | 250/559.07 |
| 2020/0130397 A1* | 4/2020 | Jolic | ............... | B42D 25/425 |

FOREIGN PATENT DOCUMENTS

| | | | |
|---|---|---|---|
| CN | 104034517 A | * | 9/2014 |
| CN | 104034517 A | | 9/2014 |
| CN | 109141825 A | | 1/2019 |

* cited by examiner

FOCAL-LENGTH MEASURING APPARATUS FOR SUB WAVELENGTH OPTICAL IMAGING DEVICE AND MEASURING METHOD THEREOF

CROSS REFERENCE TO RELATED APPLICATIONS

This application is the national phase entry of International Application PCT/CN2018/110907, filed on Oct. 18, 2018 which is based upon and claims priority to Chinese Patent Application No. CN201811067021.X, filed on Sep. 13, 2018 the entire contents of which are incorporated herein by reference.

TECHNICAL FIELD

The present invention relates to the technical field of optics, particularly to a focal-length measuring apparatus for a sub-wavelength optical imaging device and a measuring method thereof.

BACKGROUND

In 2001, German professor L. Kipp published an article in journal Nature, firstly putting forward a concept of photon sieves, which was later translated into Chinese as '光子筛'. It is a novel diffraction optical imaging apparatus where the non-opaque circular ring with the Fresnel structure is substituted by the non-opaque circular ring with pinholes distributed randomly over it. Given the optimized structure, the randomly distributed pinholes can effectively suppress the higher orders of diffraction and secondary maxima to increase the image contrast and resolution, and even transcend the traditional theoretical limits of diffraction imaging and achieve a super-resolution imaging.

With the constant development of nanoscale imaging techniques, people put forward higher requirements for the resolution of optical imaging apparatus, and even requiring a sub-wavelength scale. However, according to the theories of designing the optical imaging apparatus and the structural characteristics of the optical imaging apparatus, improving the resolution is at cost of the focal length and focal depth. Namely, sub-wavelength optical imaging apparatus has a shortened focal length and a shortened focal depth, causing a high difficulty in measuring. Being unable to precisely measure the focal length makes it impossible to accurately quantify the optical properties of the sub-wavelength optical imaging apparatus. Consequently, whether the theories for design are correct and whether the manufacturing processes are reasonable cannot be verified.

However, existing focal-length measuring methods either have complicated experimental systems and high detection costs, or have a detecting precision below the requirements, so they are no longer applicable to a practical situation where the focal length is getting smaller and smaller for the further pursuit of high resolution. Therefore, the precise measurement of the focal length of the sub-wavelength optical imaging apparatus is becoming a key and difficult technical problem to be urgently solved by the industry.

SUMMARY

To solve the drawbacks of the prior art, the present invention provides a focal-length measuring apparatus for a sub-wavelength optical imaging device and a measuring method thereof, which overcomes the technical difficulties in measuring a short focal length by an accurately designed nanoscale stepped height standard sample block.

To achieve the above objective, the present invention adopts the following technical solutions.

In the first aspect, the present invention provides a focal-length measuring apparatus for a sub-wavelength optical imaging device including a laser, a beam-expanding and collimating system configured to turn light emitted by the laser into even and collimated parallel light, a sub-wavelength optical imaging device configured to focus the parallel light on a focal plane and form speckles, and a nanoscale stepped height standard sample block placed on the focal plane. The nanoscale stepped height standard sample block is connected to a power device for driving the nanoscale stepped height standard sample block to move up and down in a vertical direction, and the power device is connected to a computer control system.

A surface of the nanoscale stepped height standard sample block is coated with a photoresist and the nanoscale stepped height standard sample block includes a plurality of steps arranged at equal intervals on a same vertical plane. One of the steps is a middle step, and a distance between the middle step and the sub-wavelength optical imaging device is a designed focal length of the sub-wavelength optical imaging device. Among all the steps, heights of the steps gradually increase from the middle step to an upper side, and values of corresponding focal lengths decrease. While, heights of the steps gradually decrease from the middle step to a lower side, and values of corresponding focal lengths increase. A wavelength of the laser is equal to a designed wavelength of an input light source of the sub-wavelength optical imaging device.

Further, the sub-wavelength optical imaging device is a sub-wavelength photon sieve or a micro/nano optical lens.

Further, height differences between adjacent steps are not equal. Closing to the middle step, the height differences between adjacent steps are decreased. Departing from the middle, the height differences between adjacent steps are increased.

Further, the height differences between adjacent steps are equal.

Further, the power device is a stepping motor.

Further, the intervals between two adjacent steps range from 50 μm-100 μm.

In the second aspect, the present invention provides a measuring method using the focal-length measuring apparatus for a sub-wavelength optical imaging device. When there is an error $\pm \Delta x_N$ between an actual focal length and a designed focal length $f_0$ of the sub-wavelength optical imaging device, the measuring method includes the following steps:

1) adjusting the sub-wavelength optical imaging device till its focus is focused on the middle step of the nanoscale stepped height standard sample block, at this time, a corresponding focal length is $f_0$;

2) driving the nanoscale stepped height standard sample block to move upward a predetermined distance by the power device controlled by the computer control system, focusing the focus of the sub-wavelength optical imaging device on an above step in a forward direction, and accomplishing a speckle exposure process in the forward direction for one time;

wherein, the predetermined distance is equal to the interval between two adjacent steps;

3) returning back to perform the step 2) till the focus of the sub-wavelength optical imaging device moves onto the Nth step, and accomplishing the speckle exposure process in the forward direction for an Nth time, wherein a corresponding focal length after moving by the predetermined distance each time is $f_0 - \Delta x_n$, $1 \leq n \leq N$;

4) moving the power device in a counter direction by the computer control system till the focus of the sub-wavelength optical imaging device is focused on the middle step of the nanoscale stepped height standard sample block;

5) driving the nanoscale stepped height standard sample block to move downward a predetermined distance by the power device controlled by the computer control system, focusing the focus of the sub-wavelength optical imaging device on a next step in the counter direction and accomplishing a speckle exposure in the counter direction for one time;

6) returning back to perform the step 5) till the focus of the sub-wavelength optical imaging device moves onto the Nth step in the counter direction, and accomplishing the speckle exposure process in the counter direction for an Nth time, wherein a corresponding focal length after moving by the predetermined distance each time is $f_0 + \Delta x_n$;

7) developing an exposed nanoscale stepped height standard sample block by using a developing solution to obtain a series of unequal-sized speckles after a focusing of the sub-wavelength optical imaging device;

8) observing by an atomic force microscope and measuring a size of each of the speckles, wherein if the speckle of one step has the minimum size, the corresponding focal length of the step is the actual focal length of the sub-wavelength optical imaging device.

Further, if the height differences between adjacent steps are all equal to each other, namely, $\Delta x_N - \Delta x_{N-1} = \Delta x_{N-1} - \Delta x_{N-2} = \ldots = \Delta x_2 - \Delta x_1$, and $\Delta x_i - \Delta x_{i-1} = C$ is recorded, $1 < i \leq N$; wherein C is a constant value.

If the height differences between adjacent steps are not equal to each other, namely, $\Delta x_N - \Delta x_{N-1} \neq \Delta x_{N-1} - \Delta x_{N-2} \neq \ldots \neq \Delta x_2 - \Delta x_1$, and $\Delta x_i - \Delta x_{i-1} = B_i$ is recorded, wherein $B_i$ is a variable. A decrease of i indicates getting closer to the middle step and a decrease of $B_i$. An increase of i indicates getting far away from the middle step and an increase of $B_i$.

The present invention has the following advantages. According to the present disclosure, the nanoscale stepped height standard sample block is used to realize the precise measurement of the focal length through accurately designing and manufacturing the steps with different heights corresponding to different focal lengths. The technical solution only requires movements in a Y-axis direction, and the Y-axis direction controls the intervals between different exposure speckles, so the requirement for accuracy is not strict. Therefore, apart from the improvement on the measuring accuracy, the present disclosure can also reduce complexity of the measuring apparatus.

Given the nanoscale stepped height standard sample block in the present disclosure, the heights of the steps and the height differences between adjacent steps can be adjusted according to the actual requirements, which is free and flexible. Compared with the existing measuring apparatuses, the present disclosure needs no precise piezoelectric ceramic (which has high precision, and is fragile and expensive) to control the movement in an X-axis direction (a focal-length direction), thereby greatly reducing measuring cost of the system.

Since no Charge-coupled Device (CCD) is used in the measuring apparatus of the present disclosure, the measuring precision is not related to the pixel pitch of the CCD. Moreover, since no optical enlargement process is involved, the errors caused by the enlargement process won't be introduced.

Figure 1:
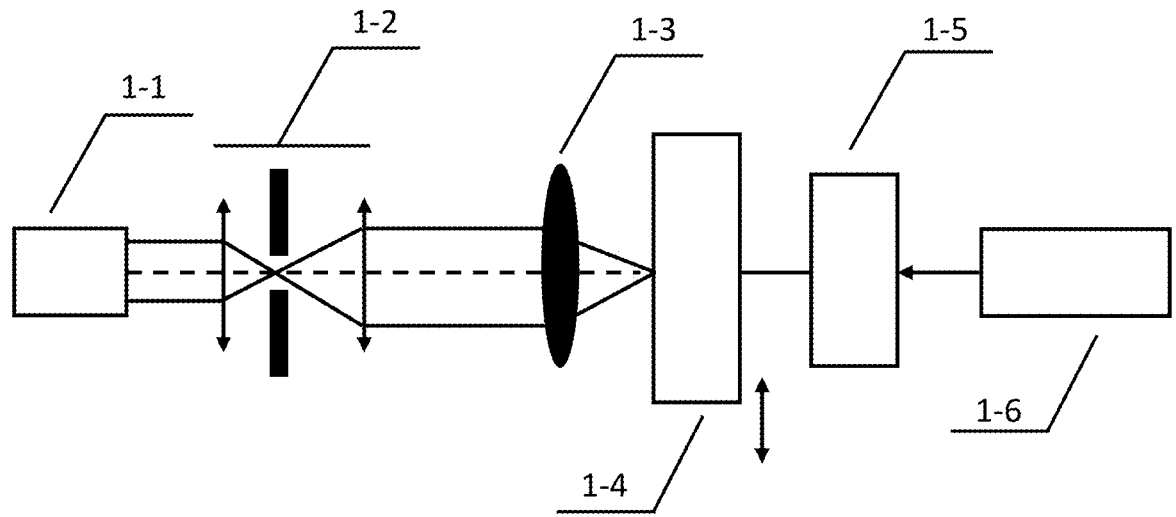
FIG. 1 is a functional block diagram of a focal-length measuring apparatus for an optical imaging device.

The reference designators in the drawings are described below: 1-1, laser; 1-2, beam-expanding and collimating system; 1-3, sub-wavelength optical imaging device; 1-4, nanoscale stepped height standard sample block; 1-5, power device; 1-6, computer control system.

DETAILED DESCRIPTION OF THE EMBODIMENTS

The specific embodiments of the present invention will be described hereinafter for those skilled in the art to understand the present invention. It should be noted that the present invention is not limited to the scope of the specific embodiments. As for those skilled in the art, as long as the various variations fall within the spirit and scope of the present invention as defined by the appended claims, and these variations are obvious, all such inventions derived from the idea of the present invention are covered by the present invention.

As shown in FIG. 1, a focal-length measuring apparatus for an optical imaging device includes the laser 1-1, the beam-expanding and collimating system 1-2, the sub-wavelength optical imaging device 1-3, the nanoscale stepped height standard sample block 1-4, the power device 1-5, and the computer control system 1-6, etc. The sub-wavelength optical imaging device 1-3 is a sub-wavelength photon sieve or a micro/nano optical lens, the power device 1-5 is a stepping motor, a surface of the nanoscale stepped height standard sample block 1-4 is coated with a photoresist.

A light emitted by the laser 1-1 is processed by the beam-expanding and collimating system 1-2 to form even and collimated parallel light. The parallel light is focused by the sub-wavelength optical imaging device 1-3 to form tiny speckles on a focus plane. The nanoscale stepped height standard sample block 1-4 coated with the photoresist is placed on the focus plane. The nanoscale stepped height standard sample block 1-4 driven by the power device 1-5 moves up and down. And, the power device 1-5 is controlled by the computer control system 1-6.

Figure 2:
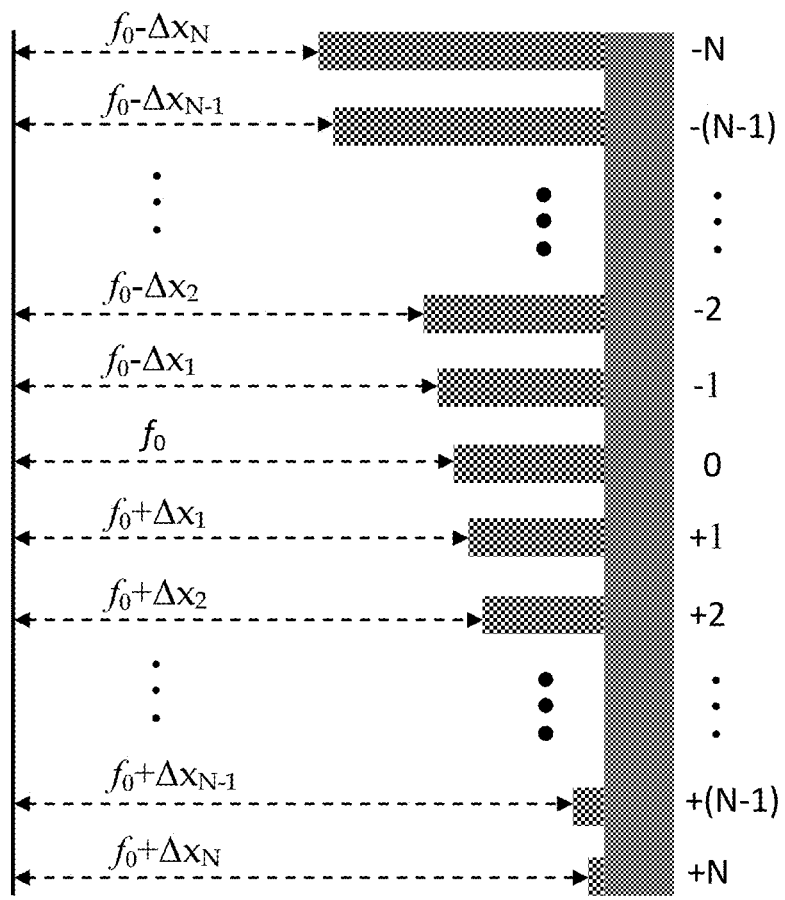
FIG. 2 is a schematic diagram showing that the steps of a nanoscale stepped height standard sample block are labeled with corresponding focal lengths.

As shown in FIG. 2, the nanoscale stepped height standard sample block 1-4 includes a plurality of steps arranged at equal intervals on the same vertical plane. The different heights of steps correspond to different focal lengths. One of the steps is a middle step. A distance between the middle step and the sub-wavelength optical imaging device 1-3 is a designed focal length of the sub-wavelength optical imaging device 1-3. Among all the steps, heights of the steps gradually increase from the middle step to an upper side, and values of the corresponding focal lengths decrease. While, heights of the steps gradually decrease from the middle step to a lower side, and values of the corresponding focal lengths increase. A wavelength of the laser 1-1 is equal to a designed wavelength of an input light source of the sub-wavelength optical imaging device 1-3.

As different heights of the steps correspond to different focal lengths, the exposed nanoscale stepped height standard sample block 1-4 is developed to obtain a series of unequal-sized speckles. A specific size of each of the speckles can be observed through an atomic force microscope and measured with the software of the atomic force microscope. If the speckle of a certain step has the minimum size, the corresponding focal length of that step is an actual focal length of the sub-wavelength optical imaging device.

Since errors exist in the manufacturing process of the sub-wavelength optical imaging device 1-3, there is a certain error between the actual focal length and the designed focal length. If the designed focal length is $f_0$, and the error is $\pm\Delta x_N$, the nanoscale stepped height standard sample block may be designed to have 2N+1 steps. The corresponding focal length of each of the steps is shown in FIG. 2.

As for the value of $\Delta x_N$, it is generally set to make the focal length in a range of ±10% designed focal length according to the actual requirements. Fox example, if the designed focal length is 150 μm, the $\Delta x_N$ is set as 15 μm. Then, a starting point of the range may be set as 135 μm and an ending point may be set as 165 μm.

In FIG. 2, '0' corresponds to the designed focal length of the sub-wavelength photon sieves. Going up from '0', the heights of the steps increase and the focal lengths decrease. Going down from '0', the heights of the steps decrease and the focal lengths increase. Each interval $\Delta y$ between two steps in a vertical direction is a fixed value and can be set by manufacturers' own, when the nanoscale stepped height standard sample block 1-4 is manufactured.

As for the interval $\Delta y$ between adjacent steps, it aims to separate the adjacent exposure speckles, so as to facilitate the measurement of the actual sizes of the speckles by the atomic force microscope. The larger the value of $\Delta y$, the better. However, by considering a measurement range of the power device 1-5, a preferred value range of $\Delta y$ in the present disclosure is 50 μm-100 μm.

During implementation, the height difference between two steps in a horizontal direction can be set as a fixed value. Namely, the height differences between adjacent steps are all equal to each other, i.e., $\Delta x_N - \Delta x_{N-1} = \Delta x_{N-1} - \Delta x_{N-2} = \ldots = \Delta x_2 - \Delta x_1$, and $\Delta x_i - \Delta x_{i-1} = C$ is recorded, $1 < i \leq N$, where C is a constant value. In this way, the nanoscale stepped height standard sample block 1-4 has relatively simple manufacturing processes, while the focal-length measuring precision still can be guaranteed.

Since the focal depth of the photon sieve is small, the best focal plane may be missed if the value of the height difference between two steps closing to the focal plane is set to be too large. Considering such a situation, the height differences between two steps may be set to have different values, i.e., $\Delta x_N - \Delta x_{N-1} \neq \Delta x_{N-1} - \Delta x_{N-2} \neq \ldots \neq \Delta x_2 - \Delta x_1$, and $\Delta x_i - \Delta x_{i-1} = B_i$ is recorded, $1 < i \leq N$, wherein $B_i$ is a variable. A decrease of i indicates getting closer to the middle step and a decrease of $B_i$. An increase of i indicates getting far away from the middle step and an increase of $B_i$.

When there is an error $\pm\Delta x_N$ between the actual focal length and the designed focal length $f_0$ of the sub-wavelength optical imaging device 1-3, the measuring method includes the following steps.

1) The sub-wavelength optical imaging device is adjusted till its focus is focused on the middle step of the nanoscale stepped height standard sample block, at this time, a corresponding focal length is $f_0$.

2) The nanoscale stepped height standard sample block is driven to move upward a predetermined distance by the power device controlled by the computer control system, the focus of the sub-wavelength optical imaging device is focused on an above step in a forward direction, and a speckle exposure process in the forward direction is accomplished for one time, wherein, the predetermined distance is equal to the interval between two adjacent steps.

3) Return back to perform the step 2) till the focus of the sub-wavelength optical imaging device moves onto the Nth step, and the speckle exposure process in the forward direction is accomplished for an Nth time. A corresponding focal length after moving by the predetermined distance each time is $f_0 - \Delta x_n$, $1 \leq n \leq N$.

4) The power device is moved in a counter direction by the computer control system till the focus of the optical imaging device is focused on the middle step of the nanoscale stepped height standard sample block.

5) The nanoscale stepped height standard sample block is driven to move downward a predetermined distance by the power device controlled by the computer control system. The focus of the sub-wavelength optical imaging device is focused on a next step in the counter direction, and a speckle exposure in the counter direction is accomplished for one time.

6) Return back to perform the step 5) till the focus of the sub-wavelength optical imaging device moves onto the Nth step in the counter direction, and the speckle exposure process in the counter direction is accomplished for an Nth time. A corresponding focal length after moving by the predetermined distance each time is $f_0 + \Delta x_n$.

7) An exposed nanoscale stepped height standard sample block is developed by using a developing solution to obtain a series of unequal-sized speckles after a focusing of the sub-wavelength optical imaging device.

8) The speckles are observed and measured by an atomic force microscope. If the speckle of one step has the minimum size, the corresponding focal length of the step is the actual focal length of the sub-wavelength optical imaging device.

Above all, according to the present disclosure, the nanoscale stepped height standard sample block 1-4 is used to measure the focal length of the sub-wavelength photon sieve or the micro/nano optical lens. Besides solving the technical difficulties in measuring the short focal lengths, the nanoscale photoetching process can be simulated realistically, so a good technology foundation is provided for application of the sub-wavelength photon sieve to a nanoscale photoetching system. And, the nanoscale photoetching system can be applied to the manufacture of super-large-scale integrated circuits.

What is claimed is:

1. A focal-length measuring apparatus for a sub-wavelength optical imaging device comprising a laser, a beam-expanding and collimating system configured to turn light emitted by the laser into even and collimated parallel light, a sub-wavelength optical imaging device configured to focus the parallel light on a focal plane and form speckles, and a nanoscale stepped height standard sample block placed on the focal plane;

wherein, the nanoscale stepped height standard sample block is connected to a power device for driving the nanoscale stepped height standard sample block to move up and down in a vertical direction, and the power device is connected to a computer control system; and wherein, a surface of the nanoscale stepped height standard sample block is coated with a photoresist and the nanoscale stepped height standard sample block comprises a plurality of steps arranged at equal intervals on a same vertical plane, one of the steps is a middle step, a distance between the middle step and the sub-wavelength optical imaging device is a designed focal length of the sub-wavelength optical imaging device; among all the steps, heights of the steps gradually increase from the middle step to an upper side, and values of corresponding focal lengths decrease; heights of the steps gradually decrease from the middle step to a lower side, and values of corresponding focal lengths increase; and a wavelength of the laser is equal to a designed wavelength of an input light source of the sub-wavelength optical imaging device, wherein the sub-wavelength optical imaging device is a micro/nano optical lens, wherein the focal-length apparatus has no piezoelectric ceramic to control a movement of the focal-length apparatus, wherein when there is an error $\pm \Delta X_N$ between an actual focal length and the designed focal length, the measuring method comprises the following steps:

adjusting the sub-wavelength optical imaging device till its focus is focused on the middle step of the nanoscale stepped height standard sample block, wherein at this time, a corresponding focal length is $f_o$;

driving the nanoscale stepped height standard sample block to move upward a predetermined distance by the power device controlled by the computer control system, focusing the focus of the sub-wavelength optical imaging device on an above step in a forward direction, and accomplishing a speckle exposure process in the forward direction for one time;

wherein, the predetermined distance is equal to an interval between two adjacent steps;

returning back to perform the previous step till the focus of the sub-wavelength optical imaging device moves onto an Nth step, and accomplishing the speckle exposure process in the forward direction for an Nth time, wherein a corresponding focal length after moving by the predetermined distance each time is $f_o - \Delta x_n$, $1 < n < N$;

moving the power device in a counter direction by the computer control system till the focus of the optical imaging device is focused on the middle step of the nanoscale stepped height standard sample block;

driving the nanoscale stepped height standard sample block to move downward a predetermined distance by the power device controlled by the computer control system, focusing the focus of the sub-wavelength optical imaging device on a next step in the counter direction and accomplishing a speckle exposure in the counter direction for one time:

returning back to perform the previous step till the focus of the sub-wavelength optical imaging device moves onto an Nth step in the counter direction, and accomplishing the speckle exposure process in the counter direction for an Nth time, wherein a corresponding focal length after moving by the predetermined distance each time is $f_o + \Delta x_n$;

developing an exposed nanoscale stepped height standard sample block by using a developing solution to obtain a series of unequal-sized speckles after a focusing of the sub-wavelength optical imaging device; and observing by an atomic force microscope and measuring a size of each of the speckles, wherein if the speckle of one step has a minimum size, a corresponding focal length of the step is the actual focal length of the sub-wavelength optical imaging device.

2. The focal-length measuring apparatus for a sub-wavelength optical imaging device according to claim 1, wherein height differences between adjacent steps are not equal; closing to the middle step, the height differences between adjacent steps are decreased; departing from the middle step, the height differences between adjacent steps are increased.

3. The focal-length measuring apparatus for a sub-wavelength optical imaging device according to claim 1, wherein the height differences between adjacent steps are equal.

4. The focal-length measuring apparatus for a sub-wavelength optical imaging device according to claim 1, wherein the power device is a stepping motor.

5. The focal-length measuring apparatus for a sub-wavelength optical imaging device according to claim 1, wherein the intervals between adjacent steps range from 50 μm-100 μm.

6. The focal-length measuring method according to claim 1, wherein if the height differences between adjacent steps are all equal to each other, namely, $\Delta x_N - \Delta x_{N-1} = \Delta x_{N-1} - \Delta x_{N-2} = \ldots = \Delta x_2 - \Delta x_1$, and $\Delta x_i - \Delta x_{i-1} = C$ is recorded, $1 < i \leq N$; wherein C is a constant value;

if the height differences between adjacent steps are not equal to each other, namely, $\Delta x_N - \Delta x_{N-1} \neq \Delta x_{N-1} - \Delta x_{N-2} \neq \ldots \neq \Delta x_2 - \Delta x_1$, and $\Delta x_i - \Delta x_{i-1} = B_i$ is recorded, wherein $B_i$ is a variable, a decrease of i indicates getting closer to the middle step and a decrease of $B_i$; and an increase of i indicates getting far away from the middle step and an increase of $B_i$.

7. The focal-length measuring apparatus for a sub-wavelength optical imaging device according to claim 2, wherein the intervals between adjacent steps range from 50 μm-100 μm.

8. The focal-length measuring apparatus for a sub-wavelength optical imaging device according to claim 3, wherein the intervals between adjacent steps range from 50 μm-100 μm.

9. The focal-length measuring apparatus for a sub-wavelength optical imaging device according to claim 4, wherein the intervals between adjacent steps range from 50 μm-100 μm.

10. The focal-length measuring method according to claim 1, wherein height differences between adjacent steps are not equal; closing to the middle step, the height differences between adjacent steps are decreased; departing from the middle step, the height differences between adjacent steps are increased.

11. The focal-length measuring method according to claim 1, wherein the height differences between adjacent steps are equal.

12. The focal-length measuring method according to claim 1, wherein the power device is a stepping motor.

13. The focal-length measuring method according to claim 1, wherein the intervals between adjacent steps range from 50 μm-100 μm.

* * * * *